US010071420B2

(12) United States Patent
Hori et al.

(10) Patent No.: US 10,071,420 B2
(45) Date of Patent: Sep. 11, 2018

(54) FLAKE-LIKE SILVER POWDER, CONDUCTIVE PASTE, AND METHOD FOR PRODUCING FLAKE-LIKE SILVER POWDER

(71) Applicant: KAKEN TECH Co., Ltd., Katano-shi, Osaka (JP)

(72) Inventors: Shigeo Hori, Katano (JP); Hirohiko Furui, Katano (JP)

(73) Assignee: KAKEN TECH CO., LTD., Osaka (JP)

(*) Notice: Subject to any disclaimer, the term of this patent is extended or adjusted under 35 U.S.C. 154(b) by 0 days.

(21) Appl. No.: 14/779,075

(22) PCT Filed: May 27, 2014

(86) PCT No.: PCT/JP2014/063938
§ 371 (c)(1),
(2) Date: Sep. 22, 2015

(87) PCT Pub. No.: WO2014/208250
PCT Pub. Date: Dec. 31, 2014

(65) Prior Publication Data
US 2016/0114390 A1    Apr. 28, 2016

(30) Foreign Application Priority Data
Jun. 25, 2013    (JP) .................................. 2013-132174

(51) Int. Cl.
*B22F 1/00* (2006.01)
*C09D 5/24* (2006.01)
(Continued)

(52) U.S. Cl.
CPC .......... *B22F 1/0055* (2013.01); *B22F 1/0014* (2013.01); *B22F 1/0059* (2013.01);
(Continued)

(58) Field of Classification Search
CPC .... B22F 1/0055; B22F 1/0014; B22F 1/0059; B22F 9/24; B22F 2009/245;
(Continued)

(56) References Cited

U.S. PATENT DOCUMENTS

2009/0258202 A1* 10/2009 Sakaguchi ................ B22F 9/24
428/206
2011/0175040 A1    7/2011 Sakaguchi et al.
2014/0306167 A1* 10/2014 Terao ........................ H01B 1/02
252/514

FOREIGN PATENT DOCUMENTS

JP    2005-199267 A    7/2005
JP    2007107057 A    4/2007
(Continued)

OTHER PUBLICATIONS

International Search Report dated Sep. 2, 2014, for International Application No. PCT/JP2014/063938, together with English language translation thereof; 6 pages total.
(Continued)

*Primary Examiner* — Harold Y Pyon
*Assistant Examiner* — Danny N Kang
(74) *Attorney, Agent, or Firm* — Fitch, Even, Tabin & Flannery, L.L.P.

(57) ABSTRACT

Provided are a flaky-like silver powder having a low bulk density as well as a predetermined average particle size ($D_{50}$) and the like, which is obtainable by using a predetermined wet reduction method, a conductive paste obtainable using such a flaky-like silver powder, and a method for producing such a flaky-like silver powder.
Disclosed are a flaky-like silver powder obtainable by a wet reduction method, a conductive paste obtainable using a flaky-like silver powder, and a method for producing a flaky-like silver powder, in which the average particle size ($D_{50}$) as an equivalent circle diameter obtainable when the
(Continued)

flaky-like silver powder particles are viewed planarly is adjusted to a value within the range of 1.1 to 30 μm, the thickness of the flaky-like silver powder particles is adjusted to 0.01 to 2 μm, and the bulk density of the flaky-like silver powder is adjusted to a value within the range of 0.1 to 4 g/cm$^3$.

8 Claims, 7 Drawing Sheets

(51) Int. Cl.
*H01B 1/22* (2006.01)
*B22F 9/24* (2006.01)
*H01B 1/02* (2006.01)

(52) U.S. Cl.
CPC ............. *B22F 9/24* (2013.01); *C09D 5/24* (2013.01); *H01B 1/02* (2013.01); *H01B 1/22* (2013.01); *B22F 2009/245* (2013.01); *B22F 2301/255* (2013.01); *B22F 2304/10* (2013.01)

(58) Field of Classification Search
CPC .. B22F 2301/255; B22F 2304/10; H01B 1/22; H01B 1/02
USPC .......................................................... 252/500
See application file for complete search history.

(56) References Cited

FOREIGN PATENT DOCUMENTS

| | | |
|---|---|---|
| JP | 2009013449 A | 1/2009 |
| JP | 2012036481 A | 2/2012 |
| JP | 2012-92442 A | 5/2012 |
| JP | 2013036116 A | 2/2013 |
| WO | 2012147945 A1 | 11/2012 |

OTHER PUBLICATIONS

Extended European Search Report dated Mar. 31, 2017, for counterpart European Patent Application No. 14816104.5.

* cited by examiner

FLAKE-LIKE SILVER POWDER, CONDUCTIVE PASTE, AND METHOD FOR PRODUCING FLAKE-LIKE SILVER POWDER

CROSS-REFERENCE TO RELATED APPLICATIONS

This Application is a U.S. National Stage Application filed under 35 U.S.C. § 371 of International Application PCT/JP2014/063938, filed May 27, 2014, designating the United States, which claims priority from Japanese Patent Application 2013-132174, filed Jun. 25, 2013, the complete disclosures of which are hereby incorporated herein by reference in their entirety for all purposes.

TECHNICAL FIELD

The present invention relates to a flaky-like silver powder (sometimes called as a flaky silver powder), a conductive paste (sometimes called as an electroconductive paste), and a method for producing a flaky-like silver powder.

More particularly, the invention relates to a flaky-like silver powder which has a predetermined average particle size and the like and also has a small bulk density, a conductive paste using such a flaky-like silver powder, and an efficient method for producing such a flaky-like silver powder.

BACKGROUND ART

Electroconductive pastes that are obtained by uniformly mixing and dispersing predetermined amounts of metal powders in electrically insulating resins have been conventionally used.

As a metal powder that is mixed and dispersed in such a conductive paste, for example, flat silver particles produced using a wet reduction method have been proposed (see, for example, Patent Document 1).

More specifically, a flat silver powder composed of particles that have a flat shape and are obtainable by a wet reduction method, characterized in that the average major axis of primary particles thereof obtainable by an image analysis of a scanning electron microscopic image (SEM) is 0.1 µm to 1.0 µm, the average thickness of the primary particles is 10 nm to 100 nm, and the coefficient of variation (CV) value of the average major axis is 0.3 or less.

Furthermore, the average particle size ($D_{50}$) of the flat silver powder obtainable according to a laser diffraction scattering type particle size distribution analysis method has a value within the range of 0.1 µm to 0.8 µm.

Also, the method for producing such a flat silver powder is characterized in that a reducing agent-containing solution including an ascorbic acid-based reducing agent is added to a silver ion-containing solution including silver nitrate, citric acid in an amount of 0.5 mol to 1.0 mol per mol of silver ions, and gelatin in an amount of 20 g to 40 g per mol of silver ions, the reducing agent-containing solution containing the ascorbic acid-based reducing agent in an amount of 0.4 mol to 0.7 mol per mol of silver ions of the silver ion-containing solution.

Furthermore, similarly, flat silver particles produced using a wet reduction method, and a method for producing the same have been proposed (see, for example, Patent Document 2).

More specifically, the flat silver particles are flat silver particles in which, with regard to the crystal structure, the ratio $P_{200}/P_{111}$ of the peak $P_{200}$ of plane (200) with respect to the peak $P_{111}$ of plane (111), which is obtainable by an XRD analysis is 0.3 or less, and with regard to the morphology, the flat silver particles have a triangular contour when viewed planarly, while the flat silver particles have an average particle size of 0.01 to 1 µm and an average thickness of 0.001 to 0.15 µm.

Also, the method for producing such flat silver particles is characterized by heating an aqueous solution including a water-soluble silver compound to 60° C. or higher in a state of having a carboxylic acid, an amine or a thiol in co-existence, and adding reducing agents in sequence to the aqueous solution including a water-soluble silver compound in that state.

CITATION LIST

Patent Document

Patent Document 1: JP 2009-13449 A (Claims)
Patent Document 2: JP 2012-36481 A (Claims)

DISCLOSURE OF THE INVENTION

Problem to be Solved by the Invention

However, the flat silver particles disclosed in Patent Document 1 have problems that the average major axis is excessively small, as small as 0.1 µm to 1.0 µm, and it is necessary to use special apparatuses such as ultrafiltration when the particles are washed, while it is economically disadvantageous because a certain extent of production time or production cost is required.

Furthermore, the value of the average particle size ($D_{50}$) of the flat silver particles thus obtainable is also excessively small, as small as 0.1 µm to 0.8 µm, and upon conduction, as the number of contact points between particles increases, the contact resistance may increase, or handling may be difficult.

Moreover, on the occasion of producing such flat silver particles, a wet reduction method is applied to silver nitrate; however, since a silver ion solution containing a significant amount of gelatin must be used, there is also a problem in view of production that it is difficult to separate off flat silver particles neatly from gelatin.

The flat silver particles disclosed in Patent Document 2 also have a problem that not only the average particle size ($D_{50}$) is excessively small, as small as 0.01 µm to 1 µm, but also the planar shape is generally limited to a triangular shape.

Furthermore, on the occasion of producing such flat silver particles, while an aqueous solution including a water-soluble silver compound has a carboxylic acid, an amine or a thiol in co-existence, reducing agents are added in sequence over several ten minutes to the aqueous solution that has been heated to 60° C. or higher, and thus there is also a problem that the production time requires a long time.

To be more specific, since the flat silver particles disclosed in Patent Documents 1 and 2 have extremely small average particle sizes ($D_{50}$), despite having a flat shape respectively, the flat silver particles lack deformability, and there is also a problem that, for example, when the flat silver particles are incorporated into a conductive paste together with an adhesive but also electrically insulating particles having a predetermined average particle size, conduction may not be substantially achieved.

Thus, the inventors of the present invention conducted a thorough investigation, and as a result, the inventors found that when a silver powder is produced using a wet reduction method, a flaky-like silver powder having a low bulk density and having a predetermined average particle size ($D_{50}$) or the like can be obtained efficiently by using nitric acid and an organic acid in combination, without using gelatin (protective colloidal agent), and that handling is made easier, and even if a relatively small amount thereof is incorporated, satisfactory electrical characteristics (specific resistance) are obtained. Thus, the inventors completed the invention.

That is, it is an object of the invention to provide a flaky-like silver powder having a predetermined bulk density, a predetermined average particle size ($D_{50}$), or the like; a conductive paste using such a flaky-like silver powder and having satisfactory electrical characteristics; and an efficient method for producing such a flaky-like silver powder.

Means for Solving Problem

According to an aspect of the invention, there is provided a flaky-like silver powder obtained by a wet reduction method, in which the average particle size ($D_{50}$) as an equivalent circle diameter obtainable when the flaky-like silver powder particles are viewed planarly is adjusted to a value within the range of 1.1 to 30 μm, the thickness of the flaky-like silver powder particles is adjusted to 0.01 to 2 μm, and the bulk density of the flaky-like silver powder is adjusted to a value within the range of 0.1 to 4 g/cm$^3$. Thus, the problems described above can be solved.

That is, since the flaky-like silver powder is a flaky-like silver powder having a low bulk density and having a predetermined thickness or a predetermined average particle size ($D_{50}$), when a conductive paste is constituted therefrom, the specific gravity can be made small, and satisfactory electrical characteristics can be manifested.

Furthermore, on the occasion of configuring the flaky-like silver powder of the invention, it is preferable that the shape of the flaky-like silver powder particles when viewed planarly is set to at least one shape selected from the group consisting of a circular shape, an elliptical shape, and a hexagonal shape.

When such a shape is used, control of the average particle size ($D_{50}$) is made easier, and more satisfactory handleability can be obtained.

Furthermore, on the occasion of configuring the flaky-like silver powder of the invention, it is preferable that notches are provided on the circumferences of the flaky-like silver powder particles.

With such a configuration, when a conductive paste is configured, satisfactory electrical contact between adjacent flaky-like silver powder particles is obtained, and the flaky-like silver powder can easily undergo deformation along the surfaces of the electrically insulating particles included in the conductive paste.

On the occasion of configuring the flaky-like silver powder of the invention, it is preferable that the flaky-like silver powder is subjected to an organic acid treatment on the surface.

When such a surface treatment with an organic acid is applied, aggregation of plural flaky-like silver powder particles can be prevented effectively, and the affinity between the flaky-like silver powder and the electrically insulating resin can be increased when the conductive paste is constituted.

According to another aspect of the invention, there is provided a conductive paste including a flaky-like silver powder that is obtained by a wet reduction method and an electrically insulating resin, in which the average particle size ($D_{50}$) as an equivalent circle diameter obtainable when the flaky-like silver powder is viewed planarly is adjusted to a value within the range of 1.1 to 30 μm, the thickness of the flaky-like silver powder particles is adjusted to 0.01 to 2 μm, and the bulk density of the flaky-like silver powder is adjusted to a value within the range of 0.1 to 4 g/cm$^3$.

That is, since a flaky-like silver powder having a low bulk density and having a uniform particle size with a predetermined average particle size ($D_{50}$) is used, the specific gravity can be made small, and satisfactory electrical characteristics can be manifested.

Furthermore, on the occasion of configuring the conductive paste of the invention, it is preferable that the electrically insulating resin includes at least one thermosetting resin selected from the group consisting of an epoxy resin, a phenolic resin, a thermosetting acrylic resin, a thermosetting urethane resin, and a silicone resin.

When such a thermosetting resin is included, satisfactory adhesion characteristics are obtained, and also, even in a case in which environmental characteristics have significantly changed, satisfactory electrical characteristics can be maintained stably.

On the occasion of configuring the conductive paste of the invention, it is preferable that the electrically insulating resin includes at least one thermoplastic resin selected from the group consisting of a polyester resin, a polyolefin resin, a polyamide resin, and a polyurethane resin.

When such a thermoplastic resin is included, predetermined adhesion characteristics are obtained, and also, in a case in which malfunction occurs in the electrical characteristics between adherends, that malfunction can be easily repaired.

Also, on the occasion of configuring the conductive paste of the invention, it is preferable that the conductive paste further includes resin particles, and flaky-like silver powder particles are adhered to the resin particles along the circumferential surface of the resin particles.

When such resin particles are included, the mechanical strength, heat resistance and the like of the conductive paste can be controlled, and also, even in a case in which the amount of incorporation of the flaky-like silver powder is much smaller, satisfactory electrical characteristics can be obtained.

On the occasion of configuring the conductive paste of the invention, it is preferable that the amount of incorporation of the flaky-like silver powder is adjusted to a value within the range of 10 to 300 parts by weight relative to 100 parts by weight of the electrically insulating resin.

When the amount of incorporation of the flaky-like silver powder is limited to such a range, the balance between the electrical characteristics and the mechanical strength of the conductive paste can be made more satisfactory.

According to still another embodiment of the invention, there is provided a method for producing a flaky-like silver powder which is formed by reacting a first aqueous solution containing silver nitrate with a second aqueous solution containing a reducing agent for silver nitrate based on a wet reduction method, and in which the average particle size ($D_{50}$) as an equivalent circle diameter when viewed planarly has a value within the range of 1.1 to 30 μm, the thickness has a value within the range of 0.01 to 2 μm, and the bulk density has a value within the range of 0.1 to 4 g/cm$^3$, characterized in that nitric acid and an organic acid are respectively incorporated into the first aqueous solution and the second aqueous solution, or into any one of the aqueous solutions.

When a flaky-like silver powder is produced as such, a flaky-like silver powder having a low bulk density and having a predetermined average particle size ($D_{50}$) and the like can be obtained efficiently, without using gelatin or the like.

On the occasion of performing the method for producing a flaky-like silver powder of the invention, it is preferable that the total amount of nitric acid is adjusted to a value within the range of 0.1% to 10% by weight, and the total amount of the organic acid is adjusted to a value within the range of 0.001% to 1% by weight, relative to the total amounts of the entirety of the first aqueous solution and the second aqueous solution.

When a flaky-like silver powder is produced by defining the total amount of nitric acid and the total amount of the organic acid as such, a flaky-like silver powder having a low bulk density and having a predetermined average particle size ($D_{50}$) and the like can be obtained more efficiently without using gelatin or the like.

Furthermore, on the occasion of performing the method for producing a flaky-like silver powder of the invention, it is preferable that in the first aqueous solution, the amount of incorporation of silver nitrate is adjusted to a value within the range of 1% to 20% by weight relative to the entire amount of the first aqueous solution.

When a flaky-like silver powder is produced by defining the amount of incorporation of silver nitrate as such, a flaky-like silver powder having a low bulk density and having a predetermined average particle size ($D_{50}$) and the like can be obtained more efficiently.

Furthermore, on the occasion of performing the method for producing a flaky-like silver powder of the invention, it is preferable that in the second aqueous solution, the amount of incorporation of the reducing agent for silver nitrate is adjusted to a value within the range of 0.5% to 20% by weight relative to the entire amount of the second aqueous solution.

When a flaky-like silver powder is produced by defining the amount of incorporation of the reducing agent for silver nitrate as such, a flaky-like silver powder having a low bulk density and a predetermined average particle size ($D_{50}$) and the like can be obtained more efficiently.

BRIEF DESCRIPTION OF DRAWINGS

FIGS. 1(a) to 1(c) are electron microscopic photographs (each at a magnification ratio of 500) of flaky-like silver powders (three kinds) having different average particle sizes and the like.

MODE(S) FOR CARRYING OUT THE INVENTION

First Embodiment

Figure 1A:
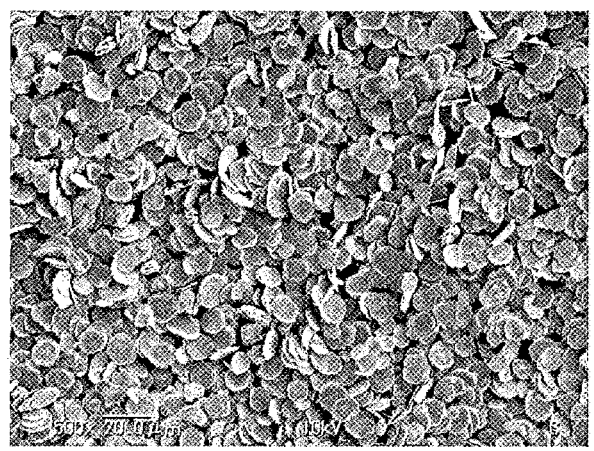
Figure 1B:
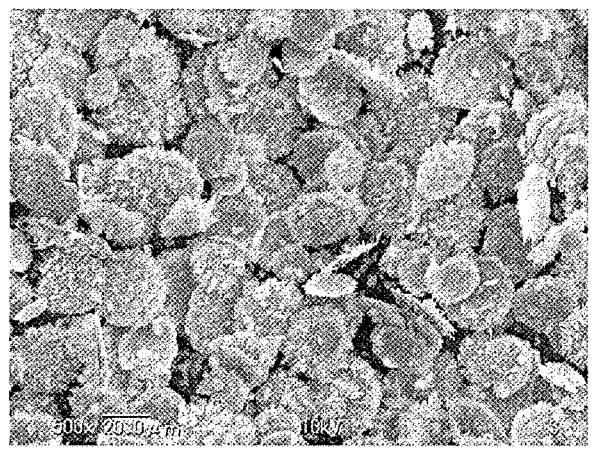
Figure 1C:
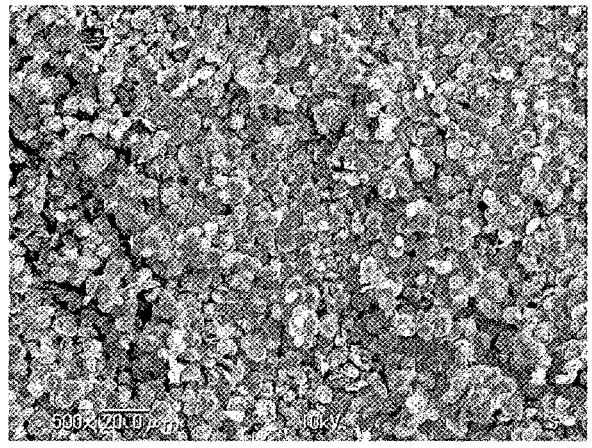
Figure 2A:
FIGS. 2(a) and 2(b) are electron microscopic photographs (each at a magnification ratio of 500) of flaky-like silver powders (two kinds) produced under conditions in which the kinds of the organic acid in the first aqueous solutions are respectively different.
Figure 2B:
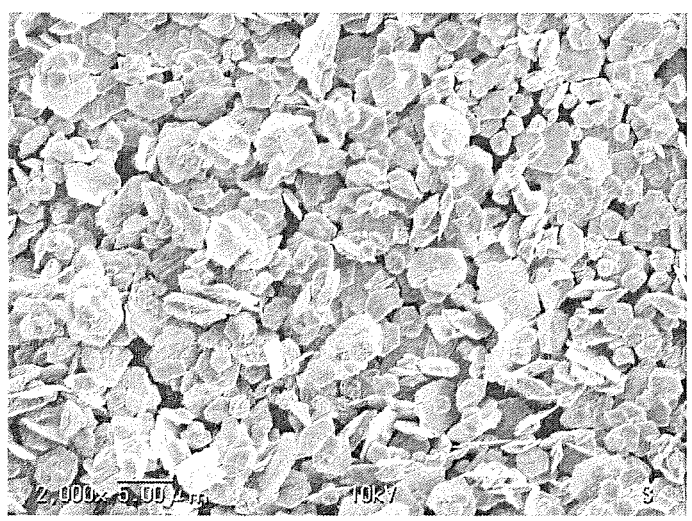

A first embodiment relates to a flaky-like silver powder obtainable by a wet reduction method, as illustrated in FIGS. 1(a) to 1(c), in which the average particle size ($D_{50}$) as an equivalent circle diameter when the flaky-like silver powder is viewed planarly is adjusted to a value within the range of 1.1 to 30 μm, the thickness of the flaky-like silver powder particles is adjusted to 0.01 to 2 μm, and the bulk density of the flaky-like silver powder is adjusted to a value within the range of 0.1 to 4 g/cm³.

In the following, the flaky-like silver powder of the first embodiment will be explained specifically with appropriate reference to the drawings.

1. Morphology (1) Flaky Shape

As illustrated in FIGS. 1(a) to 1(c), FIGS. 2(a) and 2(b), and FIG. 9, the invention is characterized in that the silver powder particles of the first embodiment have a flake-shaped form.

The reason for this is that when the silver powder particles have a flake-shaped form, the bulk density of the silver powder is decreased, and also, deformation is achieved easily.

That is, it is because when a conductive paste is configured by mixing a flaky-like silver powder with an electrically insulating resin, the density of the conductive paste can be decreased.

Figure 3A:
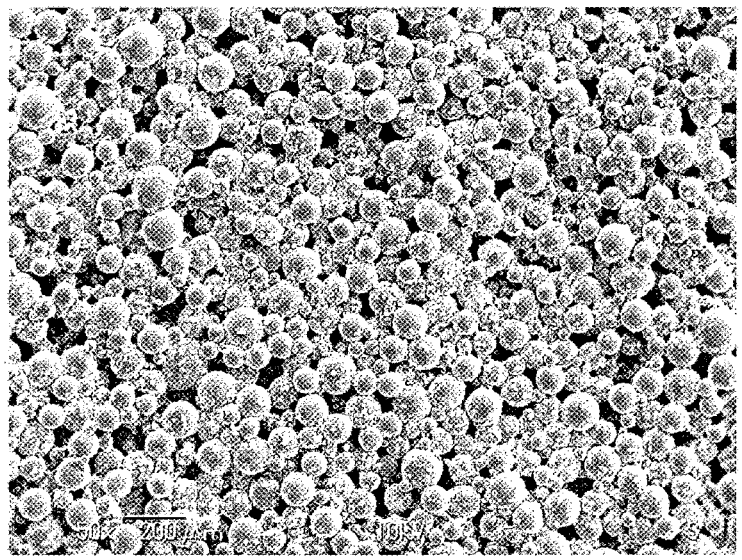
FIGS. 3(a) and 3(b) are respectively electron microscopic photographs (magnification ratios 50 and 500) of conductive pastes (thermoplastic resin) using flaky-like silver powders.
Figure 3B:
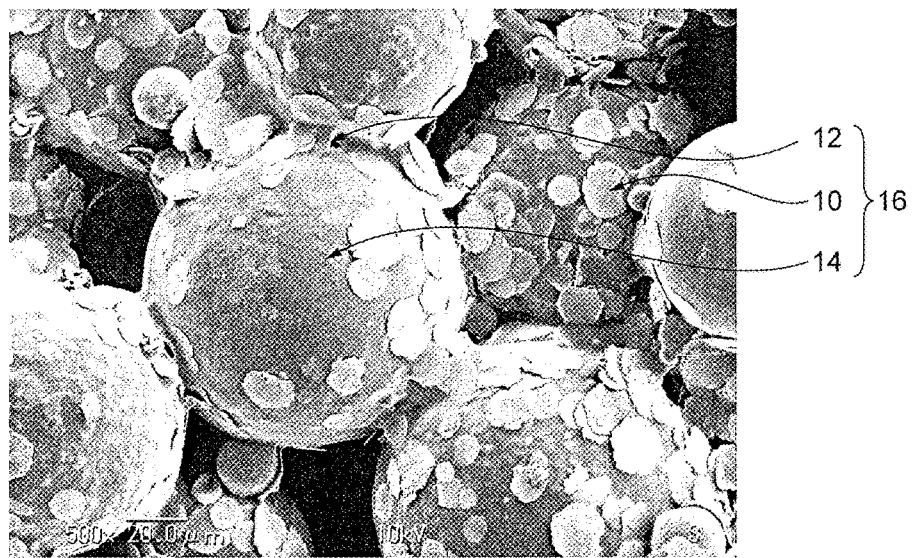

Furthermore, as illustrated in FIGS. 3(a) and 3(b), it is because even in a case in which a conductive paste 16 is composed of a flaky-like silver powder 10, an electrically insulating resin 12, and resin particles 14, since the particles of the flaky-like silver powder 10 easily deform along the curved surfaces of the resin particles 14 and adhere thereto, satisfactory electrical characteristics can be obtained for the conductive paste 16.

Figure 4:
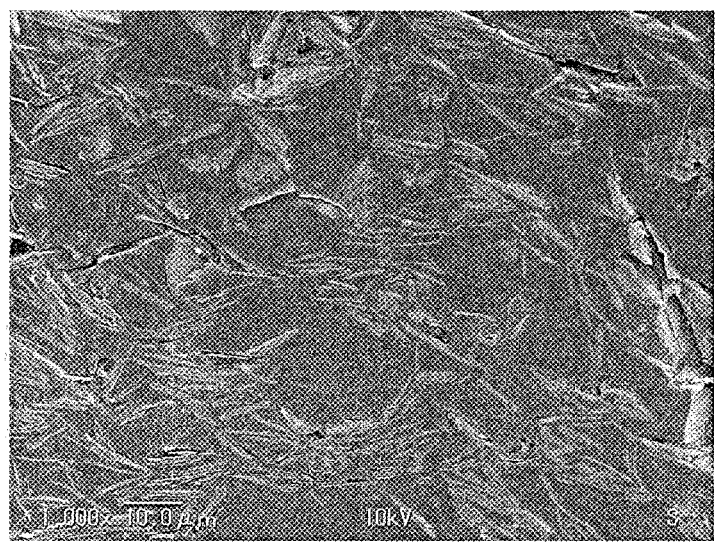
FIG. 4 is an electron microscopic photograph (magnification ratio 1000) illustrating the state of the flaky-like silver powder after curing of the conductive paste of the invention (Example 1).

In fact, as illustrated in FIG. 4, it is understood that in a cross-section of a thermally cured conductive paste 16, plural particles of the flaky-like silver powder 10 easily deform along the curved surfaces of the resin particles 14, and also, conduction is achieved as the particles are in electrical contact.

Therefore, it is preferable that the value of the ratio (average thickness/average particle size ($D_{50}$) as an equivalent circle diameter when viewed planarly) of the flaky-like silver powder that will be described below is adjusted to a value within the range of 1/3 to 1/1000, more preferably to a value within the range of 1/10 to 1/500, and even more preferably to a value within the range of 1/20 to 1/300.

(2) Planar Shape

Figure 9:
FIG. 9 is an electron microscopic photograph (magnification ratio 10,000) of a flaky-like silver powder produced under conditions in which an organic acid salt is used in the second aqueous solution.

As illustrated in FIGS. 1(*a*) to 1(*c*), FIGS. 2(*a*) and 2(*b*), and FIG. 9, it is preferable that the shape of the flaky-like silver powder particles when viewed planarly, that is, the planar shape, is set to at least one shape selected from the group consisting of a circular shape, an elliptical shape, and a hexagonal shape.

The reason for this is that, with such a planar shape, the average particle size ($D_{50}$) of the flaky-like silver powder that will be described below can be controlled easily, and more satisfactory handleability can be obtained.

Meanwhile, the average shape of the flaky-like silver powder can be directly observed from electron microscopic photographs, and can also be calculated from the electron microscopic photographs using an image analyzer.

(3) Average Particle Size ($D_{50}$)

Furthermore, the flaky-like silver powder is characterized in that the average particle size ($D_{50}$) as an equivalent circle diameter obtainable when the flaky-like silver powder is viewed planarly, is adjusted to a value within the range of 1.1 to 30 µm.

The reason for this is that if the average particle size of such a flaky-like silver powder is less than 1.1 µm, on the occasion of washing, it is necessary to use special apparatuses such as ultrafiltration; a certain extent of production time or production cost is required so that it is economically disadvantageous; handling becomes difficult due to aggregation of the particles; deformation may not occur easily; and the electrical characteristics may be deteriorated.

On the other hand, it is because if the average particle size of such a flaky-like silver powder is above 30 µm, it may be difficult to uniformly mix and disperse the flaky-like silver powder particles into the resin; the production time may be excessively lengthened; reaction control may be difficult, severe deformation may occur at the time of paste kneading; or deformation may not occur easily.

Therefore, it is more preferable that the average particle size of the flaky-like silver powder is adjusted to a value within the range of 3 to 20 µm, and even more preferably to a value within the range of 5 to 10 µm.

Figure 5:
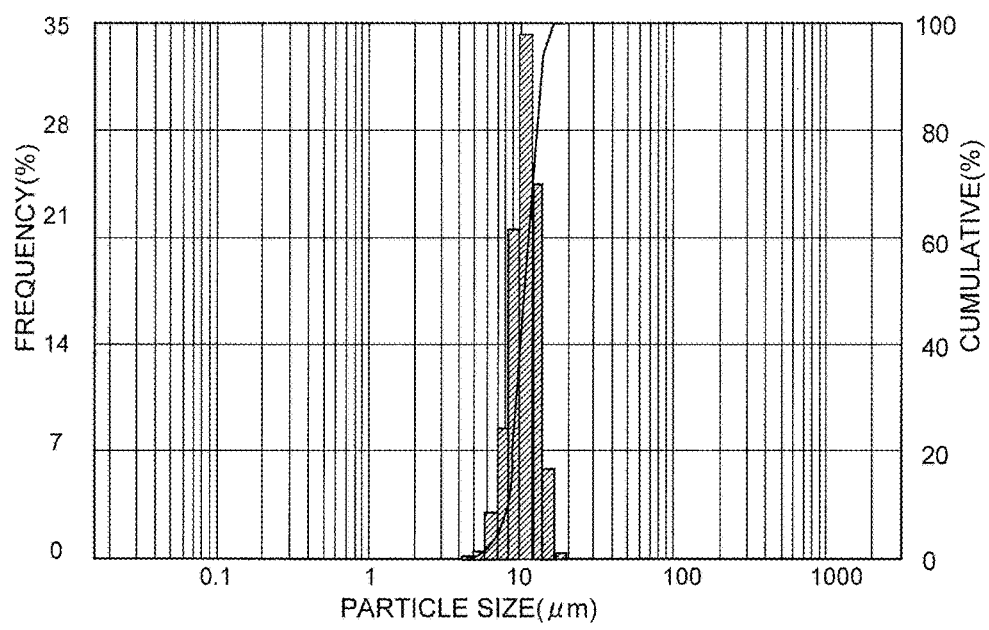
FIG. 5 is a diagram provided to explain the particle size distribution of a flaky-like silver powder (Example 1).
Figure 6:
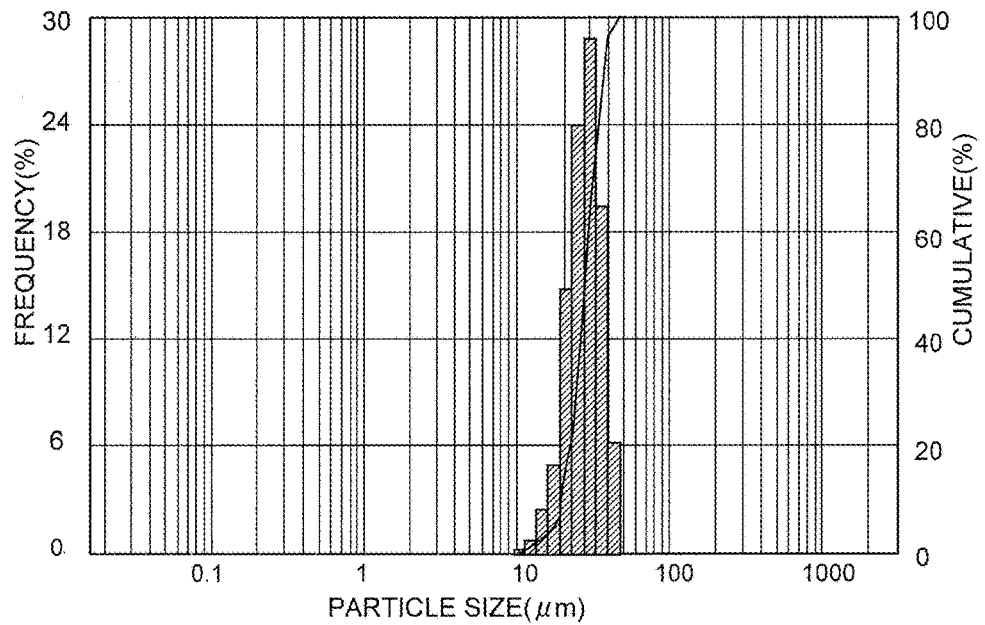
FIG. 6 is a diagram provided to explain the particle size distribution of another flaky-like silver powder (Example 2).
Figure 7:
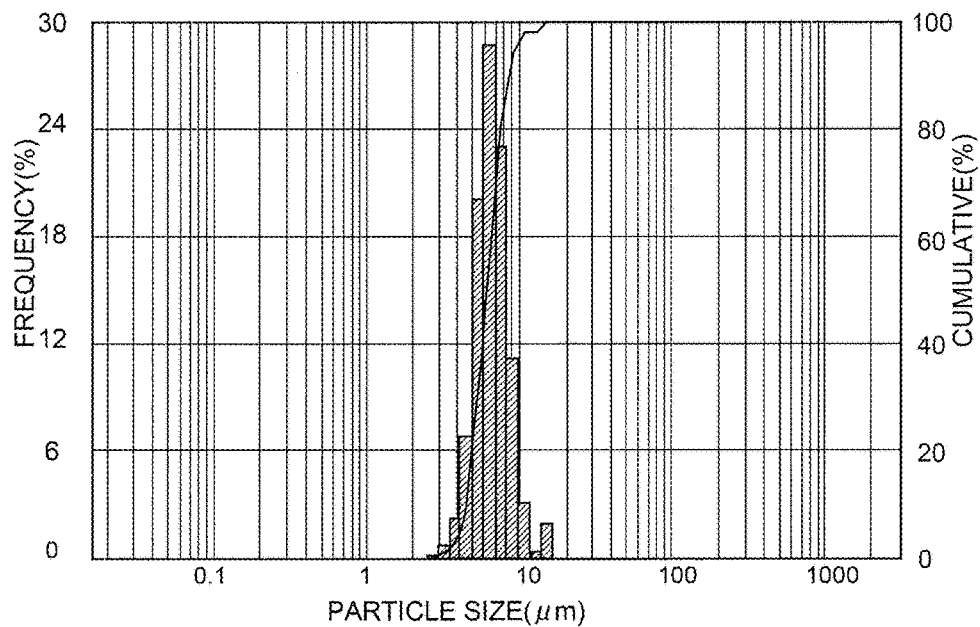
FIG. 7 is a diagram provided to explain the particle size distribution (Example 5) of still another flaky-like silver powder.

Meanwhile, as illustrated in FIGS. 5 to 7, the average particle size ($D_{50}$) of the flaky-like silver powder can be measured by a laser diffraction/scattering type particle size distribution analyzer as an equivalent circle diameter when viewed planarly, or can be actually measured from electron microscopic photographs, and can be calculated from the electron microscopic photographs using an image analyzer.

(4) Average Thickness

The flaky-like silver powder is characterized in that the average thickness of the flaky-like silver powder particles is adjusted to a value within the range of 0.01 to 2 µm.

The reason for this is that if the average thickness of such a flaky-like silver powder is below 0.01 µm, the mechanical strength may be decreased, or stable production may be made difficult.

On the other hand, it is because if the average thickness of such a flaky-like silver powder is above 2 µm, the particles do not easily deform, it may be difficult to uniformly mix and disperse the powder particles in the resin, and the production time may be excessively lengthened.

Therefore, it is more preferable that the average thickness of the flaky-like silver powder particles is adjusted to a value within the range of 0.02 to 0.5 µm, and even more preferable to a value within the range of 0.05 to 0.2 µm.

Meanwhile, the average thickness of the flaky-like silver powder can be actually measured from the electron microscopic photograph shown in FIG. 4, and can also be calculated from the electron microscopic photograph using an image analyzer.

(5) Circumferential Shape

Furthermore, regarding the contour shape of the flaky-like silver powder particles, as illustrated in FIGS. 1(*a*) to 1(*c*), it is preferable that the particles have notches along the circumferences, and the whole shape is a serrated shape.

The reason for this is that when the flaky-like silver powder particles have such a form having notches along the peripheral circumferences, the flaky-like silver powder particles can deform more easily, and when the silver powder constitutes a conductive paste, more satisfactory electrical characteristics can be obtained.

That is, as illustrated in FIG. 4, it is because the flaky-like silver powder particles can easily deform along the surfaces of the electrically insulating particles included in a conductive paste, the electrical contact between adjacent flaky-like silver powder particles is also satisfactorily achieved, and the value of the bulk density that will be described below can be decreased effectively.

Therefore, it is preferable that the flaky-like silver powder particles usually have notches with a depth of 0.01 to 3 µm along the circumferences of the flaky-like silver powder particles, more preferably have notches with a depth of 0.05 to 2 µm, and even more preferably have notches with a depth of 0.1 to 1 µm.

It has been clarified that upon providing such notches, it is suitable with regard to the production conditions that the amount of incorporation of the organic acid is adjusted to a value with the range of 0.001% to 1% by weight.

Meanwhile, whether the flaky-like silver powder particles have notches along the circumferences of the particles can be observed from electron microscopic photographs, and the presence of notches can also be determined by calculating the degree of circularity from the electron microscopic photographs using an image analyzer.

(6) Surface State

Furthermore, as illustrated in FIG. 1(*b*), it is preferable that plural microprotrusions are provided as the surface state on the surface (front surface and rear surface) of the flaky-like silver powder particles.

The reason for this is that when such plural microprotrusions are provided on the surface, even in a case in which the plural flaky-like silver powder particles are arranged in the horizontal direction, and some of them overlap in the vertical direction, spaces can be easily formed between the flaky-like silver powder particles, and therefore, the value of the bulk density can be further decreased.

On the other hand, since there is no change in the fact that plural flaky-like silver powder particles are arranged in the horizontal direction, satisfactory electrical conduction can be obtained in a transverse direction as well as in a vertical direction via the plural microprotrusions.

Here, the height of the microprotrusions is not particularly limited; however, for example, it is preferable that the height of the microprotrusions is adjusted to a value within the range of 0.001 to 1 μm, more preferably to a value within the range of 0.005 to 0.5 μm, and even more preferably to a value within the range of 0.01 to 0.2 μm.

It has been clarified, with regard to such provision of microprotrusions, that it is suitable to adjust the amount of incorporation of the organic acid to a value within the range of 0.001% to 1% by weight as the production conditions.

Meanwhile, the height of the microprotrusions on the surface of such flaky-like silver powder particles can be directly measured as an arithmetic mean value using the sum of surface roughness, or can be indirectly measured as an arithmetic mean value from electron microscopic photographs according to the scale.

2. Bulk Density

Furthermore, the flaky-like silver powder is characterized in that the bulk density of the flaky-like silver powder is adjusted to a value within the range of 0.1 to 4 g/cm³.

The reason for this is that if the bulk density of such a flaky-like silver powder has a value of below 0.1 g/cm³, the shape retainability of the flaky-like silver powder may be markedly decreased, the production process may become complicated, or the product yield at the time of production may be markedly decreased.

On the other hand, it is because if the bulk density of such a flaky-like silver powder is above 4 g/cm³, dispersion of the powder may become markedly difficult, or electric conductivity may be decreased.

Therefore, it is preferable that the bulk density of the flaky-like silver powder is adjusted to a value within the range of 0.5 to 3 g/cm³, more preferably to a value within the range of 0.7 to 3 g/cm³, and even more preferably to a value within the range of 1 to 2 g/cm³.

Meanwhile, such a bulk density of a flaky-like silver powder can be measured according to the tapping method of JIS K5101.

3. Amount of Gelatin

Also, the flaky-like silver powder is characterized in that in a case in which the flaky-like silver powder contains gelatin, the content of the gelatin is adjusted to a value of below 0.1% by weight relative to the whole amount combining the first aqueous solution and the second aqueous solution.

The reason for this is that a flaky-like silver powder can be obtained by controlling the content of gelatin.

That is, it is because in the case of obtaining a silver powder from a silver nitrate solution and a reducing agent solution using a wet reduction method, if the amount of gelatin in the silver nitrate solution and the reducing agent solution is not adjusted to a predetermined level or below, a flaky-like silver powder may not be obtained.

Therefore, it is more preferable that the content of gelatin is adjusted to a value of below 0.01% by weight relative to the whole amount combining the first aqueous solution and the second aqueous solution, and it is even more preferable to adjust the content of gelatin to zero, if possible, that is, it is more preferable not to use gelatin on the occasion of producing a flaky-like silver powder.

4. Surface Treatment

It is also preferable that the surface of the flaky-like silver powder is subjected to a treatment with an organic acid (including an organic acid salt).

The reason for this is that when a predetermined surface treatment is applied, aggregation between plural flaky-like silver powder particles can be prevented effectively, and when a conductive paste is constituted, the affinity of the flaky-like silver powder with an electrically insulating resin can be increased.

Here, the kind of the organic acid is not particularly limited as long as the organic acid is a compound has a carboxyl group, or a carboxyl group that has been converted to a salt by a base; however, specific examples thereof include a saturated fatty acid, a saturated fatty acid salt, an unsaturated fatty acid, an unsaturated fatty acid salt, an unsaturated carboxylic acid, an unsaturated carboxylic acid salt, an aromatic carboxylic acid, and an aromatic carboxylic acid salt.

Furthermore, it is more preferable that the organic acid is a saturated fatty acid or a saturated fatty acid salt, and more specifically, it is preferable that the organic acid is at least one selected from the group consisting of malonic acid, succinic acid, glutaric acid, adipic acid, lauric acid, myristic acid, palmitic acid, stearic acid, oleic acid, a succinic acid salt, a glutaric acid salt, an adipic acid salt, a lauric acid salt, a myristic acid salt, a palmitic acid salt, a stearic acid salt, and an oleic acid salt.

The reason for this is that when such a fatty acid or a fatty acid salt is used, the balance between the shape retainability and conductivity of the flaky-like silver powder is further improved.

Particularly, since an excellent surface treatment effect is obtained even if a relatively small amount is used, it is preferable that the organic acid is at least one selected from the group consisting of lauric acid, myristic acid, palmitic acid, stearic acid, a lauric acid salt, a myristic acid salt, a palmitic acid salt, and a stearic acid salt.

Additionally, the organic acid may be of the same kind or may be of a different kind, from the organic acid (including an organic acid) as a shape controlling agent that will be described below.

Furthermore, it is also preferable to use alcohols such as hexanol, octanol, 2-ethylhexanol, decanol, and lauryl alcohol; and amines such as hexylamine, octylamine, 2-ethylhexylamine, decylamine, and dodecylamine as surface treating agents, in order to effectively prevent aggregation between plural flaky-like silver powder particles.

Second Embodiment

The second embodiment relates to a conductive paste including a flaky-like silver powder that is obtainable by a wet reduction method and an electrically insulating resin as illustrated in FIGS. 3(a) and 3(b), characterized in that the average particle size ($D_{50}$) as an equivalent circle diameter when the flaky-like silver powder is viewed planarly is adjusted to a value within the range of 1.1 to 30 μm, the thickness of the flaky-like silver powder particles is adjusted to 0.01 to 2 μm, and the bulk density of the flaky-like silver powder is adjusted to a value within the range of 0.1 to 4 g/cm³.

In the following, the conductive paste of the second embodiment is explained specifically with appropriate reference to the drawings.

1. Flaky Silver Powder

(1) Morphology

The form of the flaky-like silver powder used in a conductive paste can be set to the same form as that of the flaky-like silver powder of the first embodiment, as illustrated in FIGS. 1(a) to 1(c), FIGS. 2(a) and 2(b), and FIG. 9.

(2) Amount of Incorporation

Furthermore, the amount of incorporation of the flaky-like silver powder can be appropriately selected according to the use applications and the like; however, usually, it is preferable to adjust the amount of incorporation to a value within the range of 10 parts to 300 parts by weight relative to 100 parts by weight of the electrically insulating resin.

The reason for this is that when the amount of incorporation of the flaky-like silver powder is limited to such a range, the balance between the electrical characteristics and the mechanical strength of the conductive paste can be made satisfactory.

More specifically, it is because if the amount of addition of such a flaky-like silver powder is below 10 parts by weight, the specific resistance of the conductive paste thus obtainable may become excessively large.

On the other hand, it is because if the amount of addition of such a flaky-like silver powder is above 300 parts by weight, the adhesive strength of the conductive paste thus obtainable may decrease, or the viscosity increases excessively, and handling may become difficult.

Therefore, it is more preferable that the amount of addition of the flaky-like silver powder is adjusted to a value within the range of 50 parts to 200 parts by weight, and even more preferably to a value within the range of 80 parts to 100 parts by weight, relative to 100 parts by weight of the electrically insulating resin.

Here, the relationship between the amount of incorporation (% by weight) of the flaky-like silver powder and the specific resistance ($\Omega \cdot cm$) of the conductive paste in two kinds of conductive pastes (thermosetting resin and thermoplastic resin) is explained with reference to FIGS. 8(a) and 8(b).

Figure 8A:
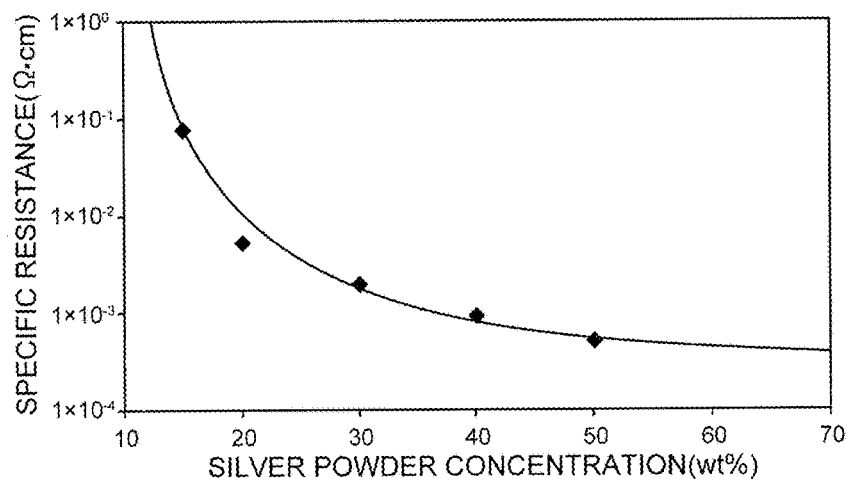
FIGS. 8(a) and 8(b) are diagrams provided respectively to explain the relationship between the amount of incorporation of the flaky-like silver powder, the specific resistance of the conductive paste (thermosetting resin), and the specific resistance of the conductive paste (thermoplastic resin).
Figure 8B:
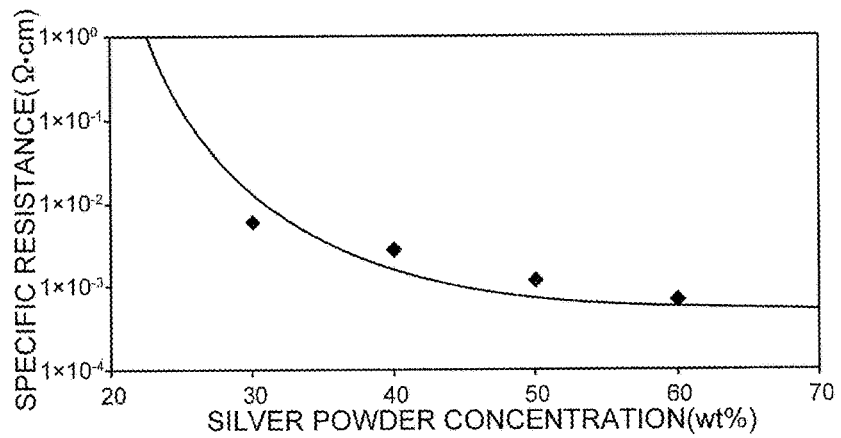

That is, the horizontal axes of FIGS. 8(a) and 8(b) represent the amount of incorporation (% by weight) of the flaky-like silver powder in the respective conductive pastes, and the vertical axes represent the specific resistance ($\Omega \cdot cm$) of the respective conductive pastes.

As is understood from the characteristics curve of FIG. 8(a), as the amount of incorporation of the flaky-like silver powder increases, the value of specific resistance ($\Omega \cdot cm$) in a case in which the conductive paste is cured is decreased. For example, when the amount of incorporation of the flaky-like silver powder is 15% by weight, the specific resistance is $7.9 \times 10^{-2}$ $\Omega \cdot cm$, while when the amount of incorporation of the flaky-like silver powder is 20% by weight, the specific resistance decreases rapidly to $5.4 \times 10^{-3}$ $\Omega \cdot cm$. Furthermore, when the amount of incorporation of the flaky-like silver powder is 40% by weight, the specific resistance decreases to $9.4 \times 10^{-4}$ $\Omega \cdot cm$; however, even when the amount of incorporation of the flaky-like silver powder is 50% to 60% by weight, the specific resistance shows an almost constant value such as about $1 \times 10^{-3}$ to $1 \times 10^{-4}$ $\Omega \cdot cm$.

Furthermore, as is understood from the characteristic curve of FIG. 8(b), even if the kind of the electrically insulating resin is a thermoplastic resin, the same tendency for specific resistance as that of the case of a thermosetting resin is obtained.

Therefore, it is understood that regardless of whether the kind of the electrically insulating resin is a thermosetting resin or a thermoplastic resin, the specific resistance of the conductive paste, that is, the electrical characteristics of the conductive paste can be accurately regulated by means of the amount of incorporation of the flaky-like silver powder.

2. Electrically Insulating Resin

(1) Type 1

Furthermore, regarding the kind of the electrically insulating resin, it is preferable that the electrically insulating resin includes at least one thermosetting resin selected from the group consisting of an epoxy resin, a phenolic resin, a thermosetting acrylic resin, a thermosetting urethane resin, and a silicone resin.

When such a thermosetting resin is included, satisfactory adhesion characteristics can be obtained, and also, satisfactory electrical characteristics can be maintained even in a case in which the environmental characteristics change significantly.

Meanwhile, it is also preferable to use an ultraviolet-curable resin or an anaerobically curable resin.

Furthermore, when the main agent of the electrically insulating resin is an epoxy resin or the like, it is preferable to incorporate a predetermined amount of a curing agent.

Such a curing agent may be any one of an imidazole compound, a secondary amine compound, a tertiary amine compound, a modified aliphatic amine compound, an epoxy resin amine adduct compound, and a combination of two or more kinds thereof.

Particularly, an epoxy resin amine adduct compound has high latency at room temperature, and is rapidly curable at 60° C. to 90° C. Therefore, an epoxy resin amine adduct compound is a preferred curing agent.

Meanwhile, examples of commercially available products of epoxy resin amine adduct compounds include AJICURE PN-23, PN-31, PN-40, and MY-24 (all manufactured by Ajinomoto Fine Techno Co., Inc.); and CUREDUCT P-0505 (manufactured by Shikoku Chemicals Corp.).

Furthermore, it is preferable that the amount of addition of such a curing agent is adjusted to a value within the range of 10 parts to 35 parts by weight relative to 100 parts by weight of the epoxy resin.

The reason for this is that if the amount of addition of such a curing agent has a value of below 10 parts by weight, curing occurs insufficiently, and the adhesion characteristics are markedly deteriorated.

On the other hand, it is because if the amount of addition of such a curing agent has a value of above 35 parts by weight, electrical conductivity may decrease, or latency may decrease.

Therefore, it is more preferable that the amount of addition of such a curing agent is adjusted to a value within the range of 13 parts to 30 parts by weight, and even more preferably to a value within the range of 15 parts to 25 parts by weight, relative to 100 parts by weight of the epoxy resin.

Meanwhile, the parts by weight of the epoxy resin that determines the amount of addition of the curing agent means, in a case in which a reactive diluent is included, the total amount in a state of including the reactive diluent as well.

(2) Type 2

Furthermore, regarding the kind of the electrically insulating resin, it is preferable that the electrically insulating resin includes at least one thermoplastic resin selected from the group consisting of a polyester resin, a polyolefin resin, a polyamide resin, and a polyurethane resin.

The reason for this is that when such a thermoplastic resin is included, predetermined adhesion characteristics are obtained, and when defects occur in the electrical characteristics between adherends, those can be repaired easily.

(3) Diluent

Furthermore, it is preferable to incorporate a diluent (including a reactive diluent) as a part of the electrically insulating resin.

Such a diluent may be any one of a monofunctional aliphatic epoxy compound, a difunctional aliphatic epoxy compound, and a monofunctional aromatic epoxy compound, or a combination of two or more kinds thereof.

More specifically, the diluent may be any one of o-sec-butylphenyl glycidyl ether, a cyclohexanedimethylol type epoxy resin, phenyl glycidyl ether, o-cresyl glycidyl ether, p-tert-butylphenyl glycidyl ether, o-phenylphenyl glycidyl ether, nonylphenyl glycidyl ether, phenol $(EO)_5$ glycidyl ether, diethylene glycol diglycidyl ether, polyethylene glycol diglycidyl ether, polypropylene glycol diglycidyl ether, glycerol polyglycidyl ether, trimethylolpropane polyglycidyl ether, 1,6-hexanediol diglycidyl ether, 1,4-butanediol diglycidyl ether, and 2-ethylhexyl glycidyl ether, or a combination of two or more kinds thereof.

It is also preferable that the amount of addition of the diluent is adjusted to a value within the range of 5% to 30% by weight relative to the whole amount of the electrically insulating resin.

The reason for this is that when the amount of addition of such a diluent has a value of below 5% by weight, adhesiveness may decrease noticeably.

On the other hand, it is because the amount of addition of such a diluent has a value of above 30% by weight, adhesiveness may decrease noticeably.

Therefore, it is more preferable that the amount of addition of such a diluent is adjusted to a value within the range of 8% to 25% by weight, and even more preferably to a value within the range of 10% to 22% by weight, relative to the whole amount of the electrically insulating resin.

3. Resin Particles

Furthermore, as illustrated in FIG. 3(b), it is preferable that resin particles (a particulate filler) 14 are incorporated into the conductive paste 16 together with the flaky-like silver powder 10 or the electrically insulating resin 12.

The reason for this is that when such resin particles are included, the flaky-like silver powder particles adhere to the periphery of the resin particles, and even in a case in which the amount of incorporation of the flaky-like silver powder is much smaller, satisfactory electrical characteristics are obtained.

Furthermore, it is because when a predetermined amount of resin particles are incorporated, the mechanical strength, heat resistance and the like of the conductive paste can be controlled.

Therefore, it is preferable to use at least one kind of resin particles such as olefin-based resin particles, acrylic resin particles, styrene-based resin particles, phenolic resin particles, and inorganic particles (aluminum oxide, glass, or the like) as the resin particles.

It is preferable that the average particle size ($D_{50}$) of such resin particles is adjusted to a value within the range of, usually, 1 to 200 μm.

The reason for this is that if the average particle size of such resin particles has a value of below 1 μm, the effect of addition may not be obtained.

On the other hand, if the average particle size of such resin particles is above 200 μm, electrical characteristics or adhesiveness is noticeably decreased.

Therefore, it is more preferable that the average particle size of such resin particles is adjusted to a value within the range of, usually, 5 to 100 μm, and even more preferably to a value within the range of 10 to 50 μm.

Meanwhile, the average particle size ($D_{50}$) of the resin particles can be measured according to JIS Z8901:2006.

4. Specific Resistance

Furthermore, it is preferable that the specific resistance of the conductive paste that includes a predetermined amount (a proportion of 100 parts by weight relative to 100 parts by weight of an electrically insulating resin) of a flaky-like silver powder is adjusted to a value within the range of $1\times10^{-5}$ to $1\times10^{-1}$ Ω·cm.

The reason for this is that if the specific resistance of such a conductive paste has a value of below $1\times10^{-5}$ Ω·cm, the kind of the flaky-like silver powder that can be used may be excessively limited, or the product yield obtainable during the production of a suitable flaky-like silver powder may be excessively decreased.

On the other hand, if such specific resistance has a value of above $1\times10^{-1}$ Ω·cm, the conduction resistance at the time of use increases, and the driving voltage may be increased.

Therefore, it is more preferable that the specific resistance of the flaky-like silver powder in a state of including a resin is adjusted to a value within the range of $1\times10^{-4}$ to $5\times10^{-2}$ Ω·cm, and even more preferably to a value within the range of $5\times10^{-4}$ to $1\times10^{-3}$ Ω·cm.

Meanwhile, the specific resistance of the conductive paste formed by including a predetermined amount of a flaky-like silver powder can be measured by a measurement method illustrated in Example 1 that is described below.

5. Various Additives

It is also preferable that various additives, for example, an oxidation inhibitor, an ultraviolet absorber, a metal ion scavenger, a viscosity adjusting agent, an inorganic filler, an organic filler, carbon fibers, a colorant, and a coupling agent, are added to the conductive paste.

Particularly, in regard to the conductive paste, since oxidative deterioration is usually accelerated by adding the flaky-like silver powder, it is preferable to add an oxidation inhibitor such as an amine-based oxidation inhibitor, a phenolic oxidation inhibitor, or a phosphoric acid ester-based oxidation inhibitor, in an amount within the range of 0.1% to 10% by weight relative to the whole amount of the conductive paste.

6. Density

It is preferable that the density of the conductive paste is adjusted to a value within the range of 1 to 3.5 g/cm$^3$.

The reason for this is that if the density of the conductive paste has a value of below 1 g/cm$^3$, electrical conductivity may decrease noticeably, or the kind of the electrically insulating resin or the like that can be used may be overlimited.

On the other hand, it is because if the density of such a conductive paste is above 3.5 g/cm$^3$, handleability may decrease, or the conductive paste may be easily detached from an adherend such as copper or silver.

Therefore, it is more preferable that the density of the conductive paste is adjusted to a value within the range of 1.2 to 3 g/cm$^3$, and even more preferably to a value within the range of 1.4 to 2.5 g/cm$^3$.

Since the conductive paste of the invention uses a flaky-like silver powder having an extremely small bulk density, the density of the conductive paste can be easily regulated to a desired range by regulating the amount of incorporation of the flaky-like silver powder.

7. Production Method

The method for producing a conductive paste that is formed by using a flaky-like silver powder is not particularly limited; however, for example, it is preferable to produce the conductive paste by mixing and dispersing a predetermined amount of a flaky-like silver powder into a resin by utilizing, for example, a propeller mixer, a planetary mixer, a three-roll, a kneader, or a spatula.

For example, it is understood that in a case in which a planetary mixer is used, when the mixing time is within the range of 10 to 120 minutes, a conductive paste which exhibits constant specific resistance after curing is obtained irrespective of the mixing time.

Furthermore, in order for the flaky-like silver powder and the electrically insulating resin to be mixed more uniformly, it is preferable that the viscosity of the electrically insulating resin is adjusted to a value within the range of 1,000 to 100,000 mPa·sec (temperature: 25° C.), and more preferably to a value within the range of 10,000 to 50,000 mPa·sec.

Moreover, it is also preferable to treat the periphery of the flaky-like silver powder in advance with a coupling agent, so that the flaky-like silver powder and the electrically insulating resin mix with each other more uniformly.

For example, it is preferable to add and mix 1 part to 10 parts by weight of γ-aminopropyltriethoxysilane or the like with respect to 100 parts by weight of the flaky-like silver powder, and to subsequently mix and disperse the flaky-like silver powder that has been treated with a coupling agent as such into the resin.

Furthermore, it is preferable that the flaky-like silver powder and the electrically insulating resin are mixed uniformly, and then aggregates of the flaky-like silver powder, contaminants and the like are removed by filtration using a filter or the like.

The reason for this is that when aggregates of the flaky-like silver powder and the like are subjected to filtration, in the case of applying the conductive paste using a dispenser or the like, clogging can be prevented effectively.

Meanwhile, since the flaky-like silver powder of the present invention has a flaky shape and is easily deformable, there is an advantage that when the flaky-like silver powder is mixed into an electrically insulating resin, generation of aggregates occurs less, and filtration treatment can be achieved easily using, for example, a mesh filter having a mesh size of 20 to 200 μm.

Third Embodiment

A third embodiment relates to a method for producing a flaky-like silver powder which is formed by reacting a first aqueous solution containing silver nitrate with a second aqueous solution containing a reducing agent for silver nitrate based on a wet reduction method, and in which the average particle size ($D_{50}$) as an equivalent circle diameter when viewed planarly has a value within the range of 1.1 to 30 μm, the thickness has a value within the range of 0.01 to 2 μm, and the bulk density has a value within the range of 0.1 to 4 g/cm$^3$, characterized in that nitric acid and an organic acid are respectively incorporated into the first and second aqueous solutions, or any one of the aqueous solutions.

In the following, the method for producing a flaky-like silver powder of the third embodiment is described specifically.

1. First Aqueous Solution

(1) Silver Nitrate

It is preferable that the amount of incorporation of silver nitrate in the first aqueous solution is adjusted to a value within the range of, usually, 1% to 20% by weight.

The reason for this is that if the amount of incorporation of such silver nitrate has a value of below 1% by weight, the production rate of the flaky-like silver powder is decreased excessively, and the production efficiency may be decreased noticeably.

On the other hand, it is because if the amount of incorporation of such silver nitrate is above 20% by weight, the viscosity of the slurry obtained by reaction and precipitation increases, and the reaction control may become difficult.

Therefore, it is more preferable that the amount of incorporation of silver nitrate that is included in the first aqueous solution is adjusted to a value within the range of 7% to 17% by weight, and even more preferably to a value within the range of 10% to 15% by weight.

(2) Nitric Acid

Furthermore, nitric acid may be incorporated into the second aqueous solution only as will be described below; however, it is preferable that in the case of incorporating nitric acid as a shape controlling agent into the first aqueous solution, the amount of incorporation of nitric acid is adjusted to a value of 20% by weight or less relative to the whole amount of the first aqueous solution.

That is, it is because if the amount of incorporation of such nitric acid is above 20% by weight, plural microprotrusions as the surface state may grow abnormally on the surfaces (front surface and rear surface) of the flaky-like silver powder particles.

However, if the amount of incorporation of nitric acid is excessively small, the effect of addition may not be exhibited stably.

Therefore, it is more preferable that the amount of incorporation of nitric acid is adjusted to a value within the range of 0.1% to 10% by weight, and even more preferably to a value within the range of 0.5% to 5% by weight, relative to the whole amount of the first aqueous solution.

(3) Organic Acid (Including Organic Acid Salt)

Furthermore, an organic acid may be incorporated into the second aqueous solution as will be described below; however, in the case of incorporating the organic acid as a shape controlling agent into the first aqueous solution, it is preferable that the amount of incorporation of the organic acid is adjusted to a value of 2% by weight or less relative to the whole amount of the first aqueous solution.

That is, it is because if the amount of incorporation of such an organic acid is above 2% by weight, the shape of the silver powder particles may be closer to a spherical shape instead of a flaky shape.

However, if the amount of incorporation of the organic acid is excessively small, the effect of addition may not be exhibited stably.

Therefore, it is more preferable that the amount of incorporation of the organic acid to a value within the range of 0.001% to 1% by weight, and even more preferably to a value within the range of 0.01% to 0.5% by weight, relative to the whole amount of the first aqueous solution.

Meanwhile, the organic acid as such a shape controlling agent may be any one of citric acid (including citric acid monohydrate), succinic acid, malic acid (including D-malic acid and L-malic acid), tartaric acid (including tartaric acid monohydrate), malonic acid, glutaric acid, adipic acid, formic acid, acetic acid, propionic acid, butyric acid and the like, or a combination of two or more kinds thereof.

Furthermore, it is also preferable to incorporate an organic acid salt as a shape controlling agent, and in the case of incorporating an organic acid salt, it is preferable that the amount of incorporation thereof is adjusted to a value of 2% by weight or less relative to the whole amount of the first aqueous solution.

The reason for this is that if the amount of incorporation of the organic acid salt has a value of above 2% by weight, the shape of the silver powder does not become flaky. On the other hand, it is because if the amount of incorporation of the organic acid salt is excessively small, the effect of addition may not be exhibited stably.

Therefore, it is more preferable that the amount of incorporation of the organic acid salt is adjusted to a value within the range of 0.001% to 1% by weight, and even more preferably to a value within the range of 0.01% to 0.5% by weight, relative to the whole amount of the first aqueous solution.

Meanwhile, the organic acid salt as such a shape controlling agent may be any one of organic acid ammonium salts such as ammonium polyacrylate, ammonium citrate, ammonium succinate, ammonium malate, ammonium tartrate, ammonium malonate, ammonium glutarate, ammonium adipate, ammonium formate, ammonium acetate, ammonium propionate, and ammonium butyrate; organic acid sodium salts such as sodium polyacrylate, sodium citrate, and sodium succinate; and organic acid potassium salts such as potassium polyacrylate, potassium citrate, and potassium succinate; and organic acid amine salts such as polyacrylic acid monoethanolamine and citric acid monoethanolamine, or a combination of two or more kinds thereof.

(4) Ammonia and/or Amine Compound

Furthermore, ammonia and/or an amine compound (hereinafter, may be simply indicated as ammonia and the like) may be incorporated into the second aqueous solution as will be described below; however, when the ammonia and the like are incorporated as a shape controlling agent into the first aqueous solution, it is preferable that the amount of incorporation thereof is adjusted to a value of 2% by weight or less relative to the whole amount of the first aqueous solution.

That is, it is because if the amount of incorporation of such ammonia and the like is above 2% by weight, the particle size of the flaky-like silver powder particles thus obtainable may become too small.

However, if the amount of incorporation of such ammonia and the like is excessively small, the effect of incorporation may not be obtained, and the control of the average particle size or the like may be difficult.

Therefore, it is more preferable that the amount of incorporation of ammonia and the like is adjusted to a value within the range of 0.1% to 1.5% by weight, and even more preferably to a value within the range of 0.5% to 1% by weight, relative to the whole amount of the first aqueous solution.

Meanwhile, ammonia and the like can be incorporated as, for example, aqueous ammonia (concentration 28%), and in that case, the amount of incorporation is determined by considering the concentration.

Furthermore, suitable examples of the amine compound include alcohol amine compounds such as monoethanolamine, diethanolamine, triethanolamine, monoisopropanolamine, diisopropanolamine, triisopropanolamine, N-methylmonoethanolamine, N-ethylmonoethanolamine, N-butylmonoethanolamine, N-methyldiethanolamine, N-ethyldiethanolamine, N-butyldiethanolamine, N-cyclohexyldiethanolamine, N,N-dimethylmonoethanolamine, N,N-diethylmonoethanolamine, N,N-dibutylmonoethanolamine, aminomethylpropanol, aminoethylpropanediol, aminomethylpropanediol, and aminobutanol; and alkylamine compounds such as methylamine, dimethylamine, trimethylamine, ethylamine, diethylamine, triethylamine, propylamine, dipropylamine, tripropylamine, butylamine, dibutylamine, and tributylamine.

(5) Water

Furthermore, the amount of incorporation of water (ion-exchanged water) is defined as the balance obtainable after subtracting the contents of silver nitrate, nitric acid, and aqueous ammonia and the like, and water is to be incorporated in an amount that makes up 100% by weight of the whole amount of the first aqueous solution that is composed of these components.

(6) Formulation Example

Therefore, regarding a formulation example of the first aqueous solution, it is preferable that silver nitrate, nitric acid, aqueous ammonia and the like, and water are respectively incorporated, and with respect to the whole amount (100% by weight) of the first aqueous solution, the amount of incorporation of silver nitrate is adjusted to a value within the range of 1% to 20% by weight, the amount of incorporation of nitric acid is adjusted to a value of 20% by weight or less, the amount of incorporation of aqueous ammonia and the like is adjusted to a value of 2% by weight or less, and the amount of incorporation of water is set as the balance.

Furthermore, regarding another formulation example of the first aqueous solution, it is preferable that silver nitrate, nitric acid, aqueous ammonia and the like, an organic acid (including an organic acid salt), and water are respectively incorporated, and with respect to the whole amount (100% by weight) of the first aqueous solution, the amount of incorporation of silver nitrate is adjusted to a value within the range of 1% to 20% by weight, the amount of incorporation of nitric acid is adjusted to 20% by weight or less, the amount of incorporation of aqueous ammonia and the like is adjusted to 2% by weight or less, the amount of the organic acid is adjusted to 2% by weight or less, and the amount of incorporation of water is set to the balance.

Meanwhile, in regard to nitric acid, aqueous ammonia and the like, and the organic acid, as will be described above, these components can also be incorporated into the second aqueous solution, and in that case, the amounts of incorporation of nitric acid, aqueous ammonia and the like, and the organic acid in the first aqueous solution can be appropriately changed.

More specifically, in the case of incorporating nitric acid into the first aqueous solution and the second aqueous solution, it is preferable that the total amount of nitric acid is adjusted to a value within the range of 0.1% to 10% by weight with respect to the total amount of those aqueous solutions.

Furthermore, similarly, in the case of incorporating aqueous ammonia and the like and the organic acid respectively into the first aqueous solution and the second aqueous solution, it is preferable that the total amounts of aqueous ammonia and the like and of the organic acid are respectively adjusted to a value within the range of 0.001% to 1% by weight with respect to the total amount of the entirety of those aqueous solutions.

2. Second Aqueous Solution (1) Kind of Reducing Agent for Silver Nitrate

The reducing agent included in the second aqueous solution may be any one kind of formaldehyde, sodium borohydride erythorbate, hydrazine, a hydrazine compound, hydroquinone, L-ascorbic acid, an L-ascorbate, formic acid, anhydrous sodium sulfite, L(+) tartaric acid, ammonium formate, Rongalite, pyrocatechol and the like, or a combination of two or more kinds thereof.

Among these reducing agents, it is more preferable to use L-ascorbic acid or a combination of L-ascorbic acid and pyrocatechol, from the viewpoint that a reduction reaction for silver nitrate can be controlled easily.

(2) Amount of Incorporation of Reducing Agent

Furthermore, it is preferable that the amount of incorporation of the reducing agent for silver nitrate in the second aqueous solution is adjusted to a value within the range of, usually, 0.5% to 20% by weight.

The reason for this is that if the amount of incorporation of such a reducing agent has a value of below 0.5% by weight, the production rate for the flaky-like silver powder decreases excessively, and the production efficiency may decrease noticeably.

On the other hand, it is because if the amount of incorporation of such a reducing agent is above 20% by weight, the reducing agent may not be dissolved in water.

Therefore, it is more preferable that the amount of incorporation of the reducing agent included in the second aqueous solution is adjusted to a value within the range of 4% to 18% by weight, and even more preferably to a value within the range of 7% to 15% by weight.

(3) Nitric Acid

Furthermore, as described above, nitric acid may be incorporated into the first aqueous solution; however, in the case of incorporating nitric acid as a shape controlling agent into the second aqueous solution, it is preferable that the amount of incorporation thereof is adjusted to a value of 20% by weight or less relative to the whole amount of the second aqueous solution.

That is, it is because if the amount of incorporation of such nitric acid is above 20% by weight, plural microprotrusions as the surface state may grow abnormally on the surface (front surface and rear surface) of the flaky-like silver powder.

However, if the amount of incorporation of the organic acid is excessively small, the effect of addition may not be exhibited stably.

Therefore, it is more preferable that the amount of incorporation of nitric acid is adjusted to a value within the range of 0.1% to 10% by weight, and even more preferably to a value within the range of 0.5% to 5% by weight, relative to the whole amount of the second aqueous solution.

(4) Organic Acid (Including Organic Acid Salt)

Furthermore, as described above, the organic acid (including an organic acid salt) may be incorporated into the first aqueous solution; however, in the case of incorporating the organic acid as a shape controlling agent into the second aqueous solution, it is preferable that the amount of incorporation of the organic acid is adjusted to a value of 2% by weight or less relative to the whole amount of the second aqueous solution.

That is, it is because if the amount of incorporation of such an organic acid is above 2% by weight, the shape of the silver powder may become close to a spherical shape instead of a flaky shape.

However, if the amount of incorporation of the organic acid is excessively small, the effect of addition may be exhibited stably.

Therefore, it is more preferable that the amount of incorporation of the organic acid is adjusted to a value within the range of 0.001% to 1% by weight, and even more preferably to a value within the range of 0.01% to 0.5% by weight, relative to the whole amount of the second aqueous solution.

(5) Ammonia and/or Amine Compound

Furthermore, as described above, ammonia and the like may be incorporated into the first aqueous solution; however, in the case of incorporating ammonia and the like as a shape controlling agent into the second aqueous solution, it is preferable that the amount of incorporation thereof is adjusted to a value of 2% by weight or less relative to the whole amount of the second aqueous solution.

That is, it is because if the amount of incorporation of such ammonia and the like is above 2% by weight, the particle size of the silver powder particles may become too small.

However, in a case in which the amount of incorporation of such ammonia and the like is excessively small, the effect of incorporation is not obtained, and the control of the average particle size and the like may be difficult.

Therefore, it is more preferable that the amount of incorporation of ammonia and the like is adjusted to a value within the range of 0.1% to 1.5% by weight, and even more preferably to a value within the range of 0.5% to 1% by weight, relative to the whole amount of the second aqueous solution.

(6) Water

Furthermore, it is preferable that the amount of incorporation of water (ion-exchanged water) is set to the balance obtainable after subtracting the contents of the reducing agent for silver nitrate, nitric acid, the organic acid, and aqueous ammonia and the like; and the whole amount of the second aqueous solution composed of these components is adjusted to 100% by weight.

(7) Formulation Example

Regarding a formulation example of the second aqueous solution, it is preferable that a reducing agent for silver nitrate, nitric acid, an organic acid or an organic acid salt, and water are respectively incorporated, and with respect to the whole amount (100% by weight) of the second aqueous solution, the amount of incorporation of the reducing agent for silver nitrate is adjusted to a value within the range of 0.5% to 20% by weight, the amount of incorporation of nitric acid is adjusted to a value of 20% by weight or less, the amount of incorporation of the organic acid (including an organic acid salt) is adjusted to a value of 2% by weight or less, and the balance is made up by water.

Furthermore, as another formulation example of the second aqueous solution, it is preferable that a reducing agent for silver nitrate, nitric acid, an organic acid, ammonia and the like, and water are respectively incorporated, and with respect to the whole amount (100% by weight) of the second aqueous solution, the amount of incorporation of the reducing agent for silver nitrate is adjusted to a value within the range of 0.5% to 20% by weight, the amount of incorporation of nitric acid has a value of 20% by weight or less, the amount of incorporation of the organic acid is adjusted to a value of 2% by weight or less, the amount of incorporation of ammonia and the like is adjusted to a value of 2% by weight or less, and the balance is made up by water.

Meanwhile, in regard to nitric acid, aqueous ammonia and the like, and the organic acid, as described above, these components can be incorporated into the first aqueous solution and in that case, the amounts of incorporation of nitric acid, aqueous ammonia and the like, and the organic acid in the second aqueous solution can be appropriately changed.

3. Reaction Temperature

Furthermore, it is preferable that the reaction temperature at the time of performing the reduction treatment is adjusted to a value of below 60° C.

The reason for this is that if the reaction temperature has a value of 60° C. or higher, it may be difficult to control the shape and the average particle size of the flaky-like silver powder particles.

On the other hand, it is because if such a reaction temperature has a value of below 0° C., ice may precipitate out, or the amount of precipitation of the flaky-like silver powder may be decreased noticeably, and productivity of the flaky-like silver powder may be decreased.

Therefore, it is more preferable that such a reaction temperature is adjusted to a value within the range of 10° C. to 50° C., and even more preferably to a value within the range of 20° C. to 40° C.

4. Surface Treatment

It is preferable to subject the flaky-like silver powder thus obtained to a surface treatment using an organic acid (including an organic acid salt).

It is preferable that an organic acid salt solution is introduced into a container that has been subjected to a liquid phase reduction method, and thereby the flaky-like silver powder thus obtained is subjected to a surface treatment using an organic acid.

Furthermore, in the case of using an organic acid, the surface treatment can be carried out by washing the silver powder with water, subsequently performing alcohol substitution, and introducing an alcohol solution of the organic acid.

Meanwhile, when the surface treatment using an organic acid is carried out, it is preferable that the throughput of the organic acid or the organic acid salt is adjusted to a value within the range of 0.001 parts to 5 parts by weight relative to 100 parts by weight of the flaky-like silver powder.

The reason for this is that when the second aqueous solution is configured by adjusting the throughput of the organic acid as such, the balance between the shape retainability and the specific resistance of the flaky-like silver powder becomes more satisfactory.

Therefore, it is more preferable that the throughput of the organic acid is adjusted to a value within the range of 0.01 parts to 1 part by weight, and even more preferably to a value within the range of 0.05 parts to 0.5 parts by weight, relative to 100 parts by weight of the flaky-like silver powder.

5. Drying Treatment

Furthermore, it is preferable that the flaky-like silver powder that has been subjected to a predetermined surface treatment is heating treated by providing a drying process.

That is, for example, it is preferable that the flaky-like silver powder obtained by a wet reduction method is subjected to a predetermined surface treatment, and then to a heating treatment for 30 minutes at a temperature of 30° C. or higher.

The reason for this is that any liquid remaining in the interior of the flaky-like silver powder, for example, water, can be effectively scattered by such a heating treatment, and as a result, shape retainability of the flaky-like silver powder can be markedly enhanced. In other words, it is because when the flaky-like silver powder obtained by a liquid phase reduction method is left in a wetted state as it is, the shape of the flaky-like silver powder is likely to be destroyed.

Therefore, in order to obtain superior shape retainability, it is preferable to perform the heating treatment at a temperature of 40° C. to 150° C. for about 1 to 48 hours, using a vacuum oven or a constant temperature bath.

EXAMPLES

Example 1

1. Production of Flaky-Like Silver Powder and Conductive Paste (1) Production of Flaky-Like Silver Powder First, a first aqueous solution including silver nitrate, ion-exchanged water, an organic acid, and nitric acid was prepared.

That is, 4 g of silver nitrate, 24 g of ion-exchanged water, 0.02 g of citric acid (citric acid monohydrate), and 1 g of nitric acid (concentration: 69% by weight) were introduced into a vessel (vessel A) equipped with a stirring apparatus, and the mixture was stirred using a magnetic stirrer until the mixture became uniform.

Subsequently, a second aqueous solution including a reducing agent and ion-exchanged water was prepared.

That is, 3 g of L-ascorbic acid as a reducing agent and 24 g of ion-exchanged water were introduced into another vessel (vessel B) equipped with a stirring apparatus, and the mixture was stirred using a magnetic stirrer until the mixture became uniform.

Then, the respective liquids were maintained at a constant temperature so that the liquid temperature reached 26° C., and then the second aqueous solution in the vessel B was added to the first aqueous solution in the vessel A. Stirring was continued in that state, and thus a flaky-like silver powder was produced by precipitation.

Next, the flaky-like silver powder thus produced by precipitation was washed with ion-exchanged water. Subsequently, a predetermined amount of an aqueous solution (0.5 wt %) of ammonium stearate was added to the mixed liquid such that the throughput of the organic acid would be a proportion of 0.02 parts by weight relative to 100 parts by weight of the flaky-like silver powder, and thereby a surface treatment with an organic acid was carried out.

Thereafter, the flaky-like silver powder that had been subjected to a surface treatment was subjected to liquid removal by filtration, and was further dried using a vacuum oven under the conditions of 3 hours at 100° C. Thus, a flaky-like silver powder (A1, average particle size ($D_{50}$): 10.7 μm, bulk density: 1.3 g/cm$^3$) was obtained.

(2) Production of Conductive Paste Composition 100 parts by weight of EPICLON 830-S (manufactured by DIC Corp.), which is a bisphenol F type epoxy resin, 20 parts by weight of AJICURE PN-23 (manufactured by Ajinomoto Fine Techno Co., Inc.) as a curing agent, 40 parts by weight of o-sec-butylphenyl glycidyl ether (YED-122, manufactured by Mitsubishi Chemical Corp.) as a reactive diluent, and 170 parts by weight of the surface-treated silver powder (A1) obtained in section (1) were introduced into a receptacle, and then the mixture was kneaded using a spatula. Thus, a conductive paste of Example 1 was produced.

2. Evaluation of Flaky-Like Silver Powder and Conductive Paste (1) Average Particle Size ($D_{50}$) (Evaluation 1)

The particle size distribution and the average particle size ($D_{50}$) were calculated from electron microscopic photographs of the flaky-like silver powder (A1) thus obtained, using an image analysis type particle size distribution analyzer software (Mac-View Ver. 4).

Particle images on the monitor screen were directly traced using a liquid crystal pen tablet, one by one with a pen for exclusive use, and thus particles were recognized. The evaluation results thus obtained are presented in Table 1.

(2) Average Thickness (Evaluation 2)

Regarding the thickness of the flaky-like silver powder (A1) thus obtained, measurement was made at five points using an electron microscope, and the average value thereof was calculated. Also, the average thickness was evaluated according to the following criteria. The evaluation results thus obtained are presented in Table 1.

⊚: The average thickness has a value within the range of 0.02 to 1 μm.

○: The average thickness has a value within the range of 0.01 to 2 μm, which a value not included in the values within the above-mentioned range of 0.02 to 1 μm.

Δ: The average thickness has a value within the range of 0.001 to 3 μm, which is a value not included in the values within the above-mentioned range of 0.01 to 2 μm.

x: The average thickness has a value of below 0.001 μm, or a value of above 3 μm.

(3) Bulk Density (Evaluation 3)

For the flaky-like silver powder (A1) thus obtained, the bulk density was measured according to the tapping method of JIS K5101. The evaluation results thus obtained are presented in Table 1.

(4) Specific Resistance (Evaluation 4)

The specific resistance of the conductive paste thus obtained was measured. That is, the conductive paste was printed on a glass plate in an area which measured 40 mm in length, 1 mm in width, and 0.5 mm in thickness, and the conductive paste was heated and cured under the conditions of 180° C.×30 minutes. Subsequently, the resistance between two points was measured by a four terminal method, and the specific resistance was calculated. The evaluation results thus obtained are presented in Table 1.

(5) Adhesive Force (Evaluation 5)

The conductive paste thus obtained was screen printed patternwise (12.5 mm in length×25 mm in width×0.5 mm in thickness) on the edges of a copper plate having a size of 120 mm in length×25 mm in width×2 mm in thickness, and then a copper plate having a size of 120 mm in length×25 mm in width×2 mm in thickness was bonded thereon.

Subsequently, the conductive paste was heated and cured under the conditions of 180° C.×30 minutes, and this was used as a sample for adhesive force measurement.

Next, for the sample for adhesive force measurement thus obtained, the tensile shear strength was measured using a Tensilon type universal tester RTC-1310A (manufactured by Orientec Co., Ltd.), and the tensile shear strength was evaluated according to the following criteria. The evaluation results thus obtained are presented in Table 1.

⊚: The tensile shear strength has a value of 8 kgf/cm$^2$ or more.

○: The tensile shear strength has a value of 6 kgf/cm$^2$ or more.

Δ: The tensile shear strength has a value of 4 kgf/cm$^2$ or more.

x: The tensile shear strength has a value of below 2 kgf/cm$^2$.

(6) Density (Evaluation 6)

The density of the conductive paste thus obtained was measured according to JIS Z8807, and was evaluated according to the following criteria. The evaluation results thus obtained are presented in Table 1.

⊚: The density of the conductive paste has a value of below 2.5 g/cm$^3$.

○: The density of the conductive paste has a value of 2.5 g/cm$^3$ or more but less than 3.0 g/cm$^3$.

Δ: The density of the conductive paste has a value of 3.0 g/cm$^3$ or more but not more than 3.5 g/cm$^3$.

x: The density of the conductive paste has a value of above 3.5 g/cm³.

Example 2 to Example 7

In Example 2 to Example 7, when the second aqueous solution according to Example 1 was prepared, the amount of incorporation of nitric acid and the like were changed, and the influence thereof on the bulk density or average particle size of the flaky-like silver powder was investigated.

That is, in Example 2, a flaky-like silver powder (A2) was produced, and a conductive paste was produced therefrom, in the same manner as in Example 1, except that nitric acid was incorporated into the first aqueous solution and the second aqueous solution, the organic acid was incorporated into the second aqueous solution only, and the reaction temperature was set to 20° C. The flaky-like silver powder and the conductive paste were also evaluated in the same manner as in Example 1.

Furthermore, in Example 3, a flaky-like silver powder (A3) was produced, and a conductive paste was produced therefrom, in the same manner as in Example 1, except that nitric acid and the organic acid were respectively incorporated into the second aqueous solution, and the reaction temperature was set to 20° C. The flaky-like silver powder and the conductive paste were evaluated in the same manner as in Example 1.

Furthermore, in Example 4, a flaky-like silver powder (A4) was produced, and a conductive paste was produced therefrom, in the same manner as in Example 1, except that nitric acid was incorporated into the first aqueous solution and the second aqueous solution, the organic acid was incorporated into the second aqueous solution only, aqueous ammonia (product having a concentration of 28% by weight) was incorporated into the first aqueous solution only, and the reaction temperature was set to 20° C. The flaky-like silver powder and the conductive paste were evaluated in the same manner as in Example 1.

In Example 5, a flaky-like silver powder (A5) was produced, and a conductive paste was produced therefrom, in the same manner as in Example 1, except that nitric acid and the organic acid were respectively incorporated into the second aqueous solution, aqueous ammonia (product having a concentration of 28% by weight) was incorporated into the first aqueous solution only, and the reaction temperature was set to 20° C. The flaky-like silver powder and the conductive paste were evaluated in the same manner as in Example 1.

Furthermore, in Example 6, a flaky-like silver powder (A6) was produced, and a conductive paste was produced therefrom, in the same manner as in Example 1, except that the organic acid was incorporated into the second aqueous solution only, an amine compound (triethanolamine) was incorporated into the first aqueous solution only, and the reaction temperature was set to 35° C. The flaky-like silver powder and the conductive paste were evaluated in the same manner as in Example 1.

Furthermore, in Example 7, a flaky-like silver powder (A7) was produced, and a conductive paste was produced therefrom, in the same manner as in Example 1, except that the organic acid was incorporated into the second aqueous solution only, an amine compound (diethanolamine) was incorporated into the first aqueous solution only, and the reaction temperature was set to 35° C. The flaky-like silver powder and the conductive paste were evaluated in the same manner as in Example 1.

The evaluation results thus obtained respectively are presented in Table 1.

Comparative Example 1

In Comparative Example 1, a silver powder (silver powder having needle-like protrusions (B1)) was produced, and a conductive paste was produced therefrom, in the same manner as in Example 1, except that when the first aqueous solution and the second aqueous solution according to Example 1 were respectively prepared, at least nitric acid was not at all incorporated. The silver powder and the conductive paste were evaluated. The evaluation results thus obtained are presented in Table 1.

TABLE 1

|  | Example 1 | Example 2 | Example 3 | Example 4 | Example 5 | Example 6 | Example 7 | Comparative Example 1 |
|---|---|---|---|---|---|---|---|---|
| First aqueous solution | | | | | | | | |
| Silver nitrate | 4 | 4 | 4 | 4 | 4 | 4 | 4 | 4 |
| Water | 24 | 24 | 24 | 24 | 24 | 24 | 24 | 24 |
| Organic acid | 0.02 | 0 | 0 | 0 | 0 | 0 | 0 | 0 |
| Nitric acid (69 wt %) | 1 | 1.4 | 0 | 0.2 | 0 | 0.04 | 0.3 | 0 |
| Amine | 0 | 0 | 0 | 0.4 | 0.06 | 0.06 | 0.6 | 0 |
| Second aqueous solution | | | | | | | | |
| Reducing agent | 3 | 4 | 4 | 4 | 4 | 4 | 4 | 4 |
| Water | 24 | 24 | 24 | 24 | 24 | 24 | 24 | 24 |
| Organic acid | 0 | 0.04 | 0.04 | 0.01 | 0.01 | 0.01 | 0.01 | 0.01 |
| Nitric acid (69 wt %) | 0 | 0.6 | 2 | 1.8 | 2 | 1.8 | 1.8 | 0 |
| Silver particle shape | Flaky | Flaky | Flaky | Flaky | Flaky | Flaky | Flaky | Dendritic |
| Average particle size (μm) | 10.7 | 28.6 | 25.3 | 2.7 | 6.9 | 2.7 | 5 | 15.3 |
| Average thickness (μm) | ⊙ | ⊙ | ⊙ | ⊙ | ⊙ | ⊙ | ⊙ | x |

TABLE 1-continued

|  | Example 1 | Example 2 | Example 3 | Example 4 | Example 5 | Example 6 | Example 7 | Comparative Example 1 |
|---|---|---|---|---|---|---|---|---|
| Bulk density (g/cm$^3$) | 1.3 | 0.8 | 1 | 1.5 | 1.3 | 2 | 2.3 | 2.5 |
| Amount of silver particles (wt %) | 30 | 30 | 30 | 30 | 30 | 30 | 30 | 30 |
| Specific resistance (Ω · cm) | 7.6 × 10$^{-4}$ | 4.8 × 10$^{-4}$ | 6.2 × 10$^{-4}$ | 9.1 × 10$^{-4}$ | 8.5 × 10$^{-4}$ | 2.4 × 10$^{-3}$ | 3.8 × 10$^{-4}$ | 6.0 × 10$^{-3}$ |
| Evaluation of adhesive force | ⊙ | ⊙ | ⊙ | ⊙ | ⊙ | ⊙ | ⊙ | ⊙ |
| Evaluation of density | ⊙ | ⊙ | ⊙ | ⊙ | ⊙ | ⊙ | ⊙ | ⊙ |

Example 8 to Example 12

In Example 8 to Example 12, conductive pastes were produced in the same manner as in Example 1, except that the kind of the electrically insulating resin in the conductive paste was changed to an epoxy resin-based powder primer (NISSIN POWDER EP758-047 EPOPRIMER manufactured by Kuboko Paint Co., Ltd.), and for the content of the electrically insulating resin of 85 parts by weight, 80 parts by weight, 70 parts by weight, 60 parts by weight, or 50 parts by weight, the amount of incorporation of the flaky-like silver powder (A1) was set to 15 parts by weight, 20 parts by weight, 30 parts by weight, 40 parts by weight, or 50 parts by weight, respectively, while the content of the solvent (EXXSOL D80 manufactured by Exxon Mobil Corp.) was set to 50 parts by weight, respectively, as shown in Table 2. The specific resistance and the like were similarly measured. The evaluation results thus obtained respectively are presented in Table 2.

TABLE 2

|  | Example 8 | Example 9 | Example 10 | Example 11 | Example 12 |
|---|---|---|---|---|---|
| NISSIN POWDER (parts by weight) | 85 | 80 | 70 | 60 | 50 |
| Silver particles (parts by weight) | 15 | 20 | 30 | 40 | 50 |
| Solvent (parts by weight) | 50 | 50 | 50 | 50 | 50 |
| Specific resistance (Ω · cm) | 7.9 × 10$^{-2}$ | 5.4 × 10$^{-3}$ | 2.0 × 10$^{-3}$ | 9.4 × 10$^{-4}$ | 5.2 × 10$^{-4}$ |
| Evaluation of adhesive force | ⊙ | ⊙ | ⊙ | ⊙ | ⊙ |
| Evaluation of density | ⊙ | ⊙ | ⊙ | ⊙ | ⊙ |

Example 13 to Example 16

In Example 13 to Example 16, conductive pastes were produced in the same manner as in Example 1, except that the kind of the electrically insulating resin in the conductive paste was changed to a polyester resin (manufactured by Toyobo Co., Ltd., VYLON UR-3210), and for the content of the electrically insulating resin of 12 parts by weight, 10.5 parts by weight, 8.5 parts by weight, or 7 parts by weight, acrylic resin particles (manufactured by Aica Kogyo Co., Ltd., GANZPEARL GM-2810) were incorporated in an amount of 58 parts by weight, 49.5 parts by weight, 41.5 parts by weight, or 33 parts by weight, the amount of incorporation of the flaky-like silver powder (A1) was set to 30 parts by weight, 40 parts by weight, 50 parts by weight, or 60 parts by weight, and a solvent (butyl acetate) was incorporated in an amount of 55 parts by weight, 60 parts by weight, 60 parts by weight, or 65 parts by weight, respectively. Then, the specific resistance and the like were similarly measured. The results thus obtained respectively are presented in Table 3.

TABLE 3

|  | Example 13 | Example 14 | Example 15 | Example 16 |
|---|---|---|---|---|
| Electrically insulating resin (parts by weight) | 12 | 10.5 | 8.5 | 7 |
| Resin particles (parts by weight) | 58 | 49.5 | 41.5 | 33 |
| Flaky silver powder (parts by weight) | 30 | 40 | 50 | 60 |
| Solvent (parts by weight) | 55 | 60 | 60 | 65 |
| Specific resistance (Ω · cm) | 6.0 × 10$^{-3}$ | 2.8 × 10$^{-3}$ | 1.2 × 10$^{-3}$ | 7.0 × 10$^{-4}$ |
| Evaluation of density | ⊙ | ⊙ | ⊙ | ⊙ |

Example 17 and Example 18

In Example 17 and Example 18, flaky-like silver powders (A8 and A9) were respectively produced, and conductive pastes were produced therefrom, in the same manner as in Example 1, except that the kind of the organic acid used as a shape controlling agent was changed to succinic acid and tartaric acid instead of citric acid. The specific resistance and the like were similarly measured. The results thus obtained respectively are presented in Table 4.

TABLE 4

|  | Example 17 | Example 18 |
|---|---|---|
| First aqueous solution |  |  |
| Silver nitrate | 4 | 4 |
| Water | 24 | 24 |

TABLE 4-continued

|  | Example 17 | Example 18 |
| --- | --- | --- |
| Aqueous ammonia | 0.4 | 0.4 |
| Nitric acid (69 wt %) | 0.34 | 0.34 |
| Second aqueous solution |  |  |
| Reducing agent | 4 | 4 |
| Water | 24 | 24 |
| Organic acid | 0.004 | 0.01 |
|  | Succinic acid | Tartaric acid |
| Nitric acid (69 wt %) | 1.66 | 1.66 |
| Silver particle shape | Flaky | Flaky |
| Average particle size (μm) | 4.8 | 5.2 |
| Average thickness (μm) | ⊙ | ⊙ |
| Bulk density (g/cm$^3$) | 1.8 | 0.9 |
| Flaky silver powder (wt %) | 50 | 50 |
| Specific resistance (Ω · cm) | 6.3 × 10$^{-3}$ | 2.4 × 10$^{-3}$ |
| Evaluation of adhesive force | ⊙ | ⊙ |
| Evaluation of density | ⊙ | ⊙ |

Example 19, Example 20, and Comparative Example 2

In Example 19 and Example 20, as shown in Table 5, flaky-like silver powders (A10 and A11) were respectively produced, and conductive pastes were produced therefrom, in the same manner as in Example 1, except that ammonium polyacrylate (manufactured by Wako Pure Chemical Industries, Ltd., ammonium polyacrylate solution, product having a concentration of 52%) as an organic acid salt was used in an amount of 0.04 parts by weight and 0.2 parts by weight, respectively, instead of an organic acid as the shape controlling agent. The specific resistance and the like were similarly measured. The results thus obtained are presented in Table 5.

Furthermore, in Comparative Example 2, a silver powder (particulate silver powder (B2)) and a conductive paste were produced respectively in the same manner as in Example 1, except that ammonium polyacrylate was used in an amount of 1.2 parts by weight, and the specific resistance and the like were similarly measured. The results thus obtained are presented in Table 5.

TABLE 5

|  | Example 19 | Example 20 | Comparative Example 2 |
| --- | --- | --- | --- |
| First aqueous solution |  |  |  |
| Silver nitrate | 4 | 4 | 4 |
| Water | 24 | 24 | 24 |
| Aqueous ammonia | 0.5 | 0.5 | 0.5 |
| Nitric acid (69 wt %) | 0.2 | 0.2 | 0.2 |
| Second aqueous solution |  |  |  |
| Reducing agent | 4 | 4 | 4 |
| Water | 24 | 24 | 24 |
| Organic acid salt | 0.04 | 0.2 | 1.2 |
| Nitric acid (69 wt %) | 1.8 | 1.8 | 1.8 |
| Silver particle shape | Flaky | Flaky | Particulate |
| Average particle size (μm) | 1.2 | 5 | 3 |
| Average thickness (μm) | ⊙ | ⊙ | Δ |
| Bulk density (g/cm$^3$) | 0.25 | 0.6 | 2.5 |
| Flaky silver powder (wt %) | 50 | 50 | 50 |
| Specific resistance (Ω · cm) | 1.9 × 10$^{-3}$ | 2.8 × 10$^{-3}$ | Conduction being not achieved |
| Evaluation of adhesive force | ⊙ | ⊙ | ⊙ |
| Evaluation of density | ⊙ | ⊙ | ⊙ |

INDUSTRIAL APPLICABILITY

As discussed above, according to the flaky-like silver powder of the invention, a flaky-like silver powder which has a predetermined bulk density, a predetermined average particle size ($D_{50}$), and the like, can be handled easily, and gives satisfactory electrical characteristics when used to constitute a conductive paste, may be obtained using a wet reduction method.

Also, when notches are provided along the circumferences of the flaky-like silver powder particles by regulating the production conditions, and thereby the circumference is serrated, or plural microprotrusions are provided on the surfaces of the flaky-like silver powder particles, deformation or the like of the flaky-like silver powder particles can be easily induced, and the value of the bulk density can be decreased to an extreme extent.

Furthermore, according to the conductive paste of the invention, a conductive paste which has a predetermined bulk density, a predetermined average particle size ($D_{50}$) and the like, and which also acquires excellent electrical characteristics and a low density as a result of incorporating a predetermined amount of a flaky-like silver powder into an electrically insulating resin, may be obtained.

When resin particles or inorganic particles are further incorporated and dispersed in the electrically insulating resin, the mechanical strength of the conductive paste itself can be increased. Also, since the flaky-like silver powder is likely to exist in the form of being deformed along the curved surfaces of the resin particles, satisfactory electrical characteristics may be obtained even if a relatively small amount of incorporation is used.

Also, according to the method for producing a flaky-like silver powder of the invention, when a predetermined wet reduction method is used, a flaky-like silver powder which has a predetermined bulk density, a predetermined average particle size ($D_{50}$) and the like, and can be easily handled, may be obtained efficiently.

Therefore, it is expected that the flaky-like silver powder of the invention and a conductive paste formed by using the silver powder may be suitably used for electrical conduction applications and electrical grounding and shielding applications in various electric products, electronic components, and automotive products.

EXPLANATIONS OF LETTERS OR NUMERALS

10: Flaky silver powder, 12: electrically insulating resin, 14: resin particles, 16: conductive paste

The invention claimed is:

1. A wet reduction method for producing a flaky-like silver powder, the method comprising:
    reacting a first aqueous solution comprising silver nitrate with a second aqueous solution comprising a reducing agent for silver nitrate, one or both of the first aqueous solution and the second aqueous solution further comprising nitric acid, and one or both of the first aqueous solution and the second aqueous solution further comprising an organic acid;

wherein the flaky-like silver powder has an average particle size ($D_{50}$) as an equivalent circle diameter obtainable when viewed planarly ranging from 1.1 to 30 μm, the flaky-like silver powder has a thickness ranging from 0.01 to 2 μm, and the flaky-like silver powder has a bulk density ranging from 0.1 to 4 g/cm$^3$.

2. The method for producing a flaky-like silver powder according to claim 1, wherein the total amount of the nitric acid is adjusted to a value within the range of 0.1% to 10% by weight, and the total amount of the organic acid is adjusted to a value within the range of 0.001% to 1% by weight, relative to the total amount of the entirety of the first aqueous solution and the second aqueous solution.

3. The method for producing a flaky-like silver powder according to claim 1, wherein in the first aqueous solution, the amount of incorporation of the silver nitrate is adjusted to a value within the range of 1% to 20% by weight relative to the whole amount of the first aqueous solution.

4. The method for producing a flaky-like silver powder according to claim 1, wherein in the second aqueous solution, the amount of incorporation of the reducing agent for silver nitrate is adjusted to a value within the range of 0.5% to 20% by weight relative to the whole amount of the second aqueous solution.

5. The method for producing a flaky-like silver powder according to claim 1, wherein the flaky-like silver powder particles, when viewed planarly, comprise at least one shape selected from a circular shape, an elliptical shape, and a hexagonal shape.

6. The method for producing a flaky-like silver powder according to claim 1, wherein the flaky-like silver powder particles have notches along the circumferences of the particles.

7. The method for producing a flaky-like silver powder according to claim 1, further comprising adding an organic acid salt as a shape controlling agent into the first aqueous solution, the organic acid salt being added so as to amount to 2% by weight or less of the first aqueous solution.

8. The method for producing a flaky-like silver powder according to claim 1, wherein the organic acid comprises at least one of citric acid, succinic acid, malic acid, tartaric acid, malonic acid, glutaric acid, adipic acid, formic acid, acetic acid, propionic acid, and butyric acid.

\* \* \* \* \*